United States Patent [19]
Ludwig et al.

[11] Patent Number: 5,874,158
[45] Date of Patent: Feb. 23, 1999

[54] HEAT ACTIVATED TRANSLUCENT MARKING FILMS

[75] Inventors: Bret W. Ludwig, Oakdale; Chi Chung Hsu, Woodbury; Roger E. Bakken, Oakdale, all of Minn.

[73] Assignee: Minnesota Mining and manufacturing Company, St. Paul, Minn.

[21] Appl. No.: 613,567

[22] Filed: Mar. 11, 1996

[51] Int. Cl.⁶ ..................................... B32B 3/00
[52] U.S. Cl. .................. 428/195; 428/204; 428/488.1; 428/913; 428/914
[58] Field of Search .................. 428/913, 914, 428/488.1, 411.1, 195, 204, 500

[56] References Cited

U.S. PATENT DOCUMENTS

| | | | |
|---|---|---|---|
| 4,513,107 | 4/1985 | Fabbrini | 524/56 |
| 4,524,078 | 9/1985 | Fitzer et al. | 428/914 |
| 4,565,842 | 1/1986 | Fitzer et al. | 524/57 |
| 4,573,107 | 2/1986 | Stock et al. | 362/49 |
| 4,737,224 | 4/1988 | Fitzer et al. | 156/240 |
| 5,407,603 | 4/1995 | Morrison | 252/518 |
| 5,427,835 | 6/1995 | Morrison et al. | 428/96 |
| 5,536,545 | 7/1996 | Condon et al. | 428/40 |

FOREIGN PATENT DOCUMENTS 0 583 940 A2  2/1994  European Pat. Off. .

OTHER PUBLICATIONS

Lee, *Encyclopedia of Polymer Science and Engineering* 2nd Ed. (John Wiley and Sons, NY) vol. 3 pp. 552–615 (1985).

*Primary Examiner*—Elizabeth Evans
*Attorney, Agent, or Firm*—Gary L. Griswold; John H. Hornickel

[57] ABSTRACT

Heat activated, translucent marking films are disclosed. The translucent, heat activated marking film has a transferable, translucent, plastic film and field of a heat activated, translucent adhesive adhered to the plastic film. The marking film is prepared and stored on a polymeric liner until transfer by heat to a substrate, such as a back-lit sign or an awning. The film can be cut into images prior to heat transfer to the substrate according to commercial graphics techniques.

8 Claims, 1 Drawing Sheet

HEAT ACTIVATED TRANSLUCENT MARKING FILMS

FIELD OF THE INVENTION

This invention relates to marking films that are translucent and activated for transfer to a durable substrate by the application of heat. More particularly, this invention relates to the application of color graphics to a vinyl substrate.

BACKGROUND OF THE INVENTION

Minnesota Mining and Manufacturing Company ("3M") markets a variety of marking films for the application of color graphics to durable, flexible substrates.

One example of the marking films is a Panaflex™ Paint-On-Paper Series 820 marking film marketed by 3M comprising a heat-activatable, vinyl-containing screen printing ink on a paper liner for use with translucent substrates as commercial graphics, such as back-lit signs and awnings. Further details about this type of marking film are disclosed in U.S. Pat. Nos. 4,513,107; 4,542,078; 4,565,842; and 4,737,224.

Another example of the marking films is a series of heat activated films comprising a durable, glossy, plastic film having an opaque, heat activated adhesive for transfer to the durable, flexible substrate. These films are marketed by 3M as Scotchcal™ 605 Film, Scotchcal™ Series 650 Films, Scotchlite™ 2200 and 2800 films. Each of these films is useful for reflective signs, i.e., opaque substrates, because the heat activated adhesives on the films are opaque.

SUMMARY OF THE INVENTION

The art needs a heat activated marking film that is translucent. Then, translucent color graphics can be transferred to durable, flexible substrates that are also translucent, such as back-lit signs or awnings.

One aspect of the invention is a translucent, heat activated marking film comprising a transferable, translucent, plastic film and a heat activated, translucent adhesive.

Another aspect of the invention is a method for forming a color graphic on a substrate, comprising applying a translucent, heat activated marking film to the substrate, wherein the the film comprises a transferable, translucent plastic film and a heat activated, translucent adhesive, such that the film adheres to the substrate through heat activation of the adhesive.

A feature of the invention is that the film of the invention can use a shorter cycle time of heat activated transfer, about 90°–95° C. for about 2–3 minutes, than the cycle time used for Paint-On-Paper films, about 110° C. (230° F.) for 5 minutes. This feature saves both labor time and energy costs for a user.

Another feature of the invention is that upon application of the graphic over discontinuities in the substrate, such as seams, the film provides continuous coverage, unlike traditional thermally applied paint on paper which could leave a line of uncovered substrate.

Another feature of the invention is that during application of large graphic faces, when the entire face cannot be placed on the bed of the heat lamp vacuum applicator, it is not necessary to cut the graphic at the edge of the bed and splice it together in a succeeding application step. The graphic image is not disturbed by the closing of the applicator, and the extraneous heat along the edge of the applicator bed.

Another feature of the invention is the inclusion of an anti-static layer to minimize the static build up of static during cutting and handling of the graphic.

Another feature of the present invention is that marking films of the present invention minimize the use of solvents that become volatile during heat activation transfer.

Another feature of the present invention is that the method of the present invention can use a heat lamp vacuum applicator in a single step that provides excellent adhesion of the marking film to the substrate.

An advantage of the present invention is that marking films and their method of application save time, money, and energy while providing a more consistent color appearance on the substrate over longer lengths than presently available using commercial screen printing apparatus.

Another advantage of the invention is that the colored translucent films thermally applied have a related family of films which are applied by traditional pressure sensitive adhesive. Allowing a precise color match in situations in which it is desirable to use both methods of application in the construction of a graphic.

Another advantage of the invention over the traditional paint on paper is the integrity of the film permits cutting graphics without chipping of the colored film, as may occur when cutting a vinyl ink on a paper liner.

Another advantage of the present invention is that marking films of the present invention can use a polymeric transfer liner which has less tendency than a paper liner to curl during cutting and application. In addition, the polymeric liner is insensitive to increasing humidity, which exacerbates the curling of paper liners.

The ability to use a transparent liner is another advantage of the invention. By cutting the graphic image in the translucent film without cutting through the liner, the unwanted color may be removed and the carrier liner used as a transfer liner, keeping the graphics in registration during application.

Another advantage of the invention is that seams may be overlapped on the substrate without leaving an uncovered line of substrate, as is common with traditional paint on paper products. Thus, persons skilled in the art of graphic applications can realize a time savings in touch-up operations that are no longer needed.

Further features and advantages will become apparent from a description of embodiments of the invention using the following drawings.

EMBODIMENTS OF THE INVENTION

Figure 1:
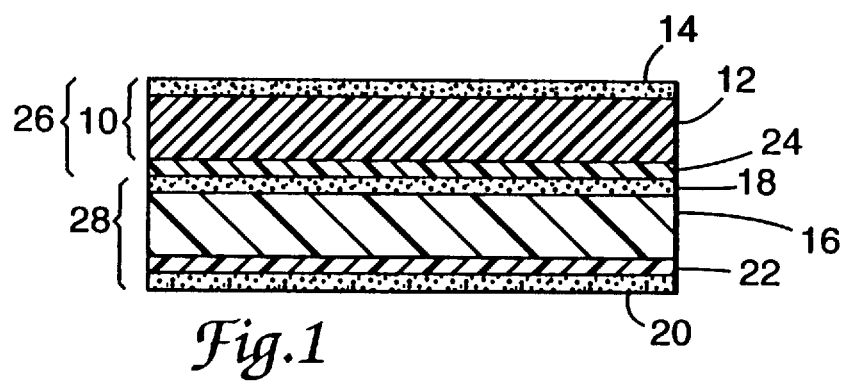
FIG. 1 is a cross-sectional view of one embodiment of the marking film of the present invention.

FIG. 1 illustrates a translucent, heat activated marking film 10 comprising a transferable, translucent, plastic film 12 having a major surface on which is applied a field 14 of heat activated, translucent adhesive. The other major surface of film 12 contacts a polymeric liner 16 which is removable from film 12 after heat transfer to a flexible substrate.

Optionally between polymeric liner 16 and film 12 is a presize coating 18 to provide gloss control for film 12.

Optionally on the opposing major surface of liner 16 is a presize coating 20 of similar composition as coating 18 to assist the handling of film 10 during manufacturing, storage and use.

Optionally between liner 16 and coating 20 is an antistatic coating 22 which assists in minimizing static electricity associated with the movement of film 10 during manufacture, storage, and use.

Figure 2:
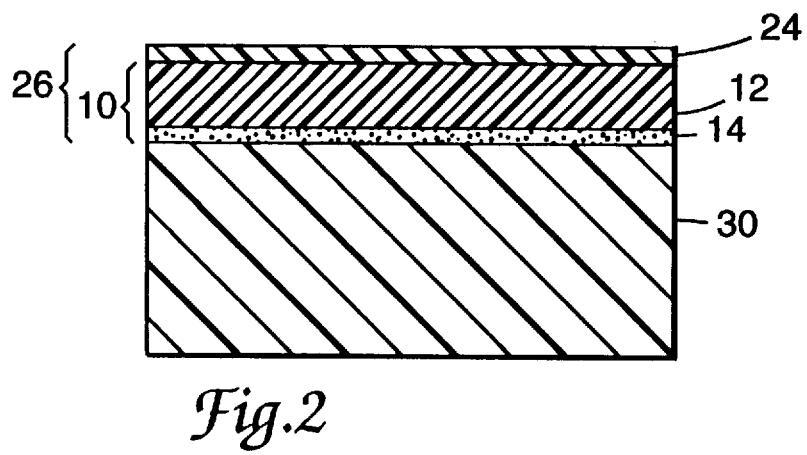
FIG. 2 is a cross-sectional view of the embodiment of FIG. 1 applied to a flexible substrate.

FIG. 2 illustrates a substrate 30 on which has been adhered film 26 after activation of adhesive field 14 using a heat lamp vacuum applicator such as those commercially available from Greco Manufacturing Company of Buchanan, Mich. The combination of substrate 24 and film 10 can be used for conventional commercial graphics applications where translucency is valued for effectiveness of appearance.

Substrates useful in the present invention can include a variety of durable, flexible substrates that are preferably translucent. Nonlimiting examples of durable, flexible substrates include plasticized poly(vinyl chloride) polymeric films reinforced by a scrim, poly(olefins), cellulose acetate butyrate, and urethane films. Useful substrates are also disclosed in U.S. Pat. Nos. 4,573,107 and 4,737,224, the disclosures of which are incorporated by reference herein. Useful substrates are marketed as Panaflex™ 930 and Panaflex™ 945 by 3M. Preferably, the substrate has a top coating of a blend of an acrylic polymer and a fluoropolymer as a protective top film such as disclosed in copending, coassigned U.S. patent application Ser. No. 07/548,857.

Films 12 useful in the marking film 10 of the present invention can include a variety of transferable, translucent plastic films. Nonlimiting examples include Tedlar™ brand polyvinyl fluoride film commercially available from DuPont Company of Wilmington, Del., polyvinylidene fluoride films, acrylic-urethane films, and vinyl-containing plastic films. To provide color to flexible substrates, a variety of colors can be used in the plastic film composition, prepared from organic and inorganic pigments, including but not limited to carbon black, phtallocyanines, and lead chromates, to provide the four basic colors of cyan, magenta, yellow, and black.

Nonlimiting examples of black pigments include carbon black such as Special Black 4, Special Black 5, Special 6, Special Black 4A, Color Black FW 200, and Color Black FW2 pigments (all manufactured by Degussa Corporation of Ridgefield, N.J.); Raven 1200 carbon black, Raven 1170 carbon black, Raven 3500 carbon black, and Raven 5750 carbon black pigments (all available from Columbian Chemical Corp. of Atlanta, Ga.); Mogol L carbon black and Sterling NS carbon black pigments (both available from Cabot Corp. of Boston, Mass.).

Nonlimiting examples of magenta pigments include Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp. of Rock Hill, S.C.); and Sunfast Magenta 122 and Sunfast Magenta 202 pigments (both available from Sun Chemical Corp. of Cincinnati, Ohio).

Nonlimiting examples of cyan pigments include Palomar Blue B-4810 PB 15:3, Palomar Blue B-4710 PB 15:1, and Palomar Blue B-4900 pigments (all available from Bayer Corp.); and Sunfast Blue 15:3 presscake pigment (available from Sun Chemical);

Nonlimiting examples of yellow pigments include Fanchon Fast Y5700 PY 139 and Fanchon Fast Yellow Y-5688 C.I. Pigment Yellow 150 pigments (available from Bayer Corp.); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy of Ardsley, N.Y.).

Nonlimiting examples of other pigments include Quinacridone Violet (Monstral Violet NRT-795-D from Ciba-Geigy); Lead Chromate (Krolor Orange KO-789-D from Cookson Pigments) and Quinacridone red (Monstral Red Y RT-759-D from Ciba-Geigy).

Preferably, the film 12 comprises a translucent vinyl film having a formulation of from about 42 to about 56 weight percent polyvinyl chloride, from about 0 to about 25 weight percent acrylic resin; from about 15 to about 25 weight percent plasticizers; from about 0 to 33 weight percent pigment; from about 0.5 to about 8 weight percent heat stabilizers; and from about 0.1 to about 6 weight percent ultra-violet protectors.

Nonlimiting examples of ultra-violet protectors include Hal-Lub, Hal-Base, Hal-Carb, Hal-Stab brand hindered amine light stabilizers ("HAL") commercially available from Hal-stab Company of Hammond, Indiana; Uvinul brand diphenylacrylate protectors commercially available from BASF of Williamsburg, Va.; and Tinuvin brand HAL stabilizers commercially available from Ciba-Geigy Corp. of Greensboro, N.C. Particularly preferred for a protector, if present in the formulation of layer 12, is Uvinul N-539 protector from BASF and Tinuvin 1130 and Tinuvin 292 HAL stabilizers from Ciba-Geigy.

Nonlimiting examples of heat stabilizers include CaZn compounds, such as Mark V-1923 brand compound from Witco of Greenwich, Conn.; BaZn compounds, such as Sympron 940 brand compound from Ferro Corp. of Cleveland, Ohio; BaCdZn compounds, such as Ferro 1237 and Sympron 856 brand compounds from Ferro Corp.; and tin mercaptide compounds, such as Termolite 31 brand compound from M&T Chemicals of Rahway, N.J. Particularly preferred, if present in the formulation of layer 12, for a heat stabilizer is Mark V-1923 brand stabilizer.

Film 12 can be prepared by bar coating on to presized liner 16 the film formulation in methyl isobutyl ketone, diisobutyl ketone, xylene, amyl acetate, methyl amyl acetate, or mineral spirits solvent with a coating thickness ranging from about 100 to about 150 $\mu$m to yield a film having a dry caliper ranging from about 47 $\mu$m to about 53 $\mu$m. Coating involves bar coating of the organosol onto the liner and obtaining the desired film thickness and a smooth, uniform film by placing a smooth, stationary bar at a fixed distance from a moving web on which the substrate lays.

Adhesive field 14 can comprise any translucent, heat activated adhesive that is nonreactive with both film 12 and substrate 30. Adhesives useful for the present invention are not tacky at room temperatures but become activated through the application of heat ranging from about 65° to about 110°C. and preferably 93° C. Polymers suitable for adhesive formulation include acrylic and ethacrylic copolymers with glass transition temperatures of between 15° and 63° C., vinyl chloride—vinyl acetate copolymers and blends thereof Nonlimiting examples of resins which have been utilized include Elvacite™ (DuPont) grades 2042, 2045, 2016, 2028, 2014, 2046 and 2044; Rohm and Haas Acryloid™ grades B-44, B-82, B-72, and B-66; and Union Carbide vinyl copolymers VYHH, VYNS, and VAGH. Preferably, adhesives used in the present invention include vinyl/acrylic blends having a weight percent ratio ranging from about 50/50 to about 90/10 and preferably about 75/25 and a viscosity of 1100–1500 centipoise.

Adhesive field 14 can be applied to film 12 by a variety of coating techniques including knife, smooth bar, extrusion, gravure, and gravure coating. The thickness of adhesive field after application can range from about 2 $\mu$m to about 200 $\mu$m and preferably from about 3 $\mu$m to about 5 m.

Polymeric liner 16 can be any conventional polymeric liner such as polyester and can have a thickness ranging from about 25 $\mu$m to about 300 $\mu$m.

Optionally but preferably, liner 16 can have presize coatings 18 and 20 from alkyd and urea-formaldehyde resins that are crosslinked with an acid catalyst and containing a $SiO_2$ filler. Such coatings can have thicknesses ranging from about 2 $\mu$m to about 50 $\mu$m and preferably from about 13 $\mu$m to about 17 $\mu$m.

Presize coatings 18 and 20 can be applied by conventional techniques known to those skilled in the art, including bar (blade) and gravure coating as disclosed in Lee, *Encyclopedia of Polymer Science and Engineering 2nd Ed.* (John Wiley and Sons, N.Y.) Vol. 3 pp. 552–615 (1985), the disclosure of which is incorporated by reference herein.

Optionally but preferably, liner 16 can have a coating 22 of antistatic agent disclosed in U.S. Pat. Nos. 5,427,835 and 5,407,603. Such anti-stat coating can have a thickness ranging from about 0.1 μm to about 10 μm, and preferably from about 0.5 μm to about 2 μm.

Anti-stat coating 22 can be applied by conventional techniques known to those skilled in the art, including gravure and Meyer rod coating as disclosed in Lee, *Encyclopedia of Polymer Science and Engineering 2nd Ed.* (John Wiley and Sons, N.Y.) Vol. 3 pp. 552–615 (1985), the disclosure of which is incorporated by reference herein.

Optionally, but preferably, film 10 may contain a protective clear layer 24 between film 12 and presize coating 18. This protective clear layer provides added solvent, chemical and dirt resistance to film 10 following application to the substrate. Such coatings include, but are not limited to acrylics, fluoropolymers, urethanes, and blends thereof Such coatings may have thicknesses ranging from about 3 to about 100 μm, and preferably from about 4 to about 8 μm.

Usefulness of the Invention

Films 10 of the present invention provide translucency as measured by a Macbeth (Newburgh, N.Y.) TR927 Densitometer using the instrument's orthochromatic filter. After zeroing of the instrument, a sample of film 10 was placed over the light source and an extension of the photodetector is lowered to block out extraneous light. With the extension in contact with the top of film 10, the measurement of optical density was performed. Translucency of film 10 is based on translucency of film 12 and translucency of adhesive field 14. Translucency can range from about 95.5 to about 0.01 percent transmission for films ranging from transparent films to opaque, black films, respectively.

Films 10 can be made in a variety of colors used for commercial graphic applications on back-lit signs or awnings. Color can be rendered durable and resistant to degradation of ultraviolet light by the inclusion of additives known to those skilled in the art. Preferably, film 10, when viewed reflectively, reflects between about 3 and about 87 percent of incident light, as measured by a Datacolor International Spectroflash 500 Colorimeter of Lawrenceville, N.J., utilizing a D65 light source and a 2° viewing angle.

The adherence of film 10 to substrate 30 can be continuous or discontinuous, patterned or randomed, and manually or mechanically applied. Use of machinery such as a Zün P-1200 electronic flatbed cutter commercially available from Zün Systemtechnik A.G. of Altstätten, Germany, driven by computer programs commercially available from Gerber Scientific Products of Manchester, Conn. can be used to cut patterns into an area of film 10 to form images, lettering, informational, promotional, or entertainment messages prior to heat transfer of film 10 to substrate 24.

The following examples further describe embodiments of the present invention.

EXAMPLES

Example 1

Preparation of presize coating

A presize solution for coatings 18 and 20 was prepared from 22.2 parts of Beetle 227-8 butylated urea formaldehyde (American Cyanimid, Wayne, N.J.); 46 parts of Alkyd G-801 238 alkyd resin (Canadian General Electric Co., Toronto, Ontario); 2.7 parts OK 412 wax coated silicon dioxide flattening agent(Degussa, St. Louis, Mo.); 0.003 parts p-toluene sulfonic acid catalyst (American Cyanimid, Wayne, N.J.); and 29.1 parts of xylene solvent (Shell Chemical of Houston, Tex.).

The solution is gravure printed using a gravure cylinder which coated a film of 5 micrometers wet thickness onto a 60 micrometer polyethylene terephthalate liner 16 and dried at temperatures up to 180° C. to yield a coatings 18 and 20 with a dry film thickness of 13–17 μm.

Example 2

Preparation of anti-stat coating

The anti-static coating is comprised of a sulfopolyester and vanadium pentoxide ($V_2O_5$). As described in U.S. Pat. No. 5,407,603 incorporated by reference, the $V_2O_5$ is prepared by hydrolizing vanadium oxoalkoxide with an excess of water to form a vanadium oxide colloidal dispersion preferably containing about 0.3 weight percent to 2.0 weight percent vanadium. The sulfopolyester is comprised of the following monomers polymerized in the following ratios, as described in U.S. Pat. No. 5,427,835 incorporated by reference.

| Monomer | Mole ratio |
| --- | --- |
| dimethyl sodium sulfonated isophthalllic acid | 0.031 |
| dimethyl terephthalate | 0.37 |
| dimethyl isophthalate | 0.094 |
| ethylene glycol | 1.00 |
| polycaprolactone diol PCP-0200 (Union Carbide, Danbury, CT) | 0.05 |

The resulting polymer was water soluble. It was combined with $V_2O_5$ and applied in an aqueous solution to the liner 16. The water was then driven off in an oven at a temperature of 163° C.

Example 3

Preparation of protective clear coat.

A protective clear coat was prepared from the following components. 4 parts of Elvacite 2020 poly (methylmethacrylate) (DuPont, Wilmington, Del.) and I part of KelF fluoropolymer (Minnesota Mining and Manufacturing, St. Paul, Minn.), a fluoropolymer composed of chlorotrifluoroethylene (55%) and vinylidene fluoride (45%). The resins were diluted to 10% solids in methyl ethyl ketone, bar coated onto presize layer 18 and dried at temperatures up to 178° C. to yield a dry film thickness of 8–12 micrometers.

Example 4

Preparation of adhesive.

An adhesive was prepared from the following components:

| | |
| --- | --- |
| VYHH (Union Carbide, Danbury, CT) | 69 parts |
| Acryloid B82 (Rohm and Haas, Philadelphia, PA) | 17 parts |
| Paraplex G62 (C.P. Hall, Bedford Park, IL) | 14 parts |

The components were dissolved in a solvent mixture comprised of equal parts xylol, methyl ethyl ketone and methyl isobutyl ketone to yield a final solution viscosity of 1100–1600 centipoise.

Example 5
Preparation of Marking Film
Film 12 was made using the following formulation:

| Component | Wt. % |
|---|---|
| Polyvinyl Chloride (Geon 178 from Union Carbide) | 46.4 |
| Polyester plasticizer (Hexanedioc acid, 1,3 butanediol, and 2-ethylhexyl ester (Plastolein 9777 from Henkel) | 16.3 |
| Methyl methacrylate, n-butyl methacrylate copolymer (Acryloid B66 from Rohm and Haas) | 1.1 |
| 2-ethylhexyl 2-cyano-3, 3diphenylacrylate (Uvinul N-539 from BASF) | 2.3 |
| Organo Calcium-Zinc (Mark V-1923 from Witco) | 2.3 |
| Quinacridone Violet (Monstral Violet NRT-795-D from Ciba-Geigy) | 0.8 |
| Lead Chromate (Krolor Orange KO-789-D from Cookson Pigments) | 4.7 |
| Quinacridone red (Monstral Red Y RT-759-D Ciba-Geigy) | 2.3 |
| Polycarboxylic acid (Disperplast-P from Byk Chemie USA) | 0.1 |
| Mineral Spirits | 4.3 |
| Xylol | 11.2 |
| Di-isobutyl ketone | 8.2 |

Following the deposition and curing of the presize layer 18, and optionally, the protective clear coat 24, the above organosol solution was bar coated at a thickness of 100 micrometers. Drying and curing of the film was performed in a series of ovens with the following temperatures and dwell times: 60 seconds at 66° C., 90 seconds at 93° C., and 45 seconds at 204° C. The resultant film has a thickness of 47.5 to 52.5 micrometers.

Example 6
Preparation of Translucent Marking Film Without Clear Coat

A 60 micrometer polyester casting liner was coated with presize formulation of Example 1 and dried to yield an overall thickness of 75 microns. Red organosol as used in Example 5 was subsequently bar coated onto the presize and dried to yield a translucent film 12, 50 micrometers thick. Adhesive of Example 4 was then gravure printed on the film 12 and dried. The solvent was driven off to yield an adhesive layer 14 having a thickness of 3–5 micrometers. After drying, the adhesive is non-tacky at room temperature, allowing the positioning of graphics cut from film 10 prior to the activation of the adhesive layer 14.

Example 7
Another Film Construction Without Clear Coat

To prepare the construction of FIG. 1, the same liner as used in Example 6 was coated with anti-static formulation prepared according to Example 2 to form layer 22 of 1 μm thickness. Presize layers 18 and 20 (both 15 μm thickness) were then applied in separate operations from the formulation of Example 1. Translucent film 12 (15 μm) and adhesive field 14 (4 μm) were then applied as described in Example 6.

Example 8
Another Film Construction Without Clear Coat

The construction shown in FIG. 1 was alternatively produced by starting with a construction comprised of liner 16 (using the 60 μm liner of Example 6), presize layer 18 (15 μm) (of Example 1), and a 50 μm film 12 (of Example 5). To this construction was applied a 1 μm anti-stat layer 22 (from Example 2), followed by a 4 μm adhesive layer 14 (from Example 4) and a 20 μm presize layer 20 (from Example 1).

Example 9
Alternate Film Construction With Clear Coat

Samples were prepared in the manner described in Example 6, with the addition of protective clear layer 24 between presize layer 18 and film 12. The protective clear was prepared according to Example 3 and bar coated on to presize layer 18 at a wet thickness of 50 μm and dried at temperatures up to 180° C. to a dry film thickness of 5 82 m before application of film 12.

Example 10
Preparation of Another Translucent Marking Film with an Alternative Translucent Adhesive Another marking film was prepared according to Example 8 except that the adhesive was Swift Adhesives 2001 adhesive bar coated at a gap of 50 micrometers and dried at 66° C. for 3 minutes.

Example 11
Results of Films of Examples 6–10

This Example concerns the transfer of translucent vinyl films of Examples 6–10 by thermal activation of the adhesive field 14 to a flexible substrate (Panaflex™ 945, Commercial Graphics Division, 3M) using a heat lamp vacuum applicator (Greco Manufacturing, Buchanan, Mich.) operating at 10° C.

Lettering and images were cut from film 10 of Examples 5–9 using a Züin P-1200 electronic flatbed cutter driven by Gerber software. The construction was placed with the adhesive field up on top of the cutting bed and the vacuum in the bed turned on to keep the material motionless during cutting. The pressure on the cutting stylis was adjusted so that it cut through film 26, but not into liner 28. Following cutting the unwanted portions of color were removed from the liner prior to film 10's application to the substrate.

The application involves placing the construction adhesive field down on top of the substrate, which is placed on the applicator with the face to be decorated facing up. A rubber diaphragm was lowered over the vacuum table and the substrate resting upon it. The rubber diaphragm is preferably lined with a porous material, typically muslin, on its bottom surface—that facing the translucent film and the substrate. The air was then evacuated from between the rubber diaphragm and the vacuum table by means of a vacuum pump, reducing the pressure in the frame to between about 0.1 and 0.25 atmospheres for a period of 2 to 5 minutes.

A bank of heat lamps, which preferably emit in the infrared region of the spectrum, was lowered over the rubber diaphragm. Following evacuation of the air to 114 mm Hg between the vacuum table and rubber diaphragm, the lamps were turned on to provide the heat necessary to activate the adhesive field 14. The temperature was raised to 93° C. and maintained at that temperature for 2 minutes, by the automated control of a sensor placed in the vacuum table which turned the lamps on and off in order to maintain the temperature within 4 degrees of 93° C. The operation of the heat lamp vacuum applicator was described earlier in U.S. Pat. No. 4,737,224, incorporated by reference herein.

Following 2 minutes of heating at 93° C., the bank of heat lamps was turned off and raised. The rubber diaphragm was raised and then the vacuum pump turned off. The decorated substrate was allowed to cool on the vacuum table for 5 minutes prior to moving it to another table upon which cooling was completed. After cooling, liner 28 was removed, leaving the decorated substrate shown in FIG. 2.

Liner 28 is a multi-functional component. Liner 16 serves as the casting liner during manufacture. Anti-stat 22 controls static during fabrication, handling, cutting and applying of film 10. Presize 20 serves to prevent blocking of adhesive 14 to liner 28 during storage, and presize 18 provides the gloss appearance desired on the surface of film 10. In addition, liner 28 serves as the application carrier, maintaining images and lettering in register until application.

Film 10 from Example 6 had an optical density of 2.53 and percent transmission of 0.295. The same film was applied to Panaflex™ 945 substrate as described in Example 11. The combination of film 26 on the substrate had an optical density of 2.94 and percent transmission of 0.114. r.

Example 12

Film 10 prepared according to Example 6 was applied to a rigid 9.5 mm acrylic sheet (Plexiglas™ from Rohm and Haas) using the method of Example 11. The adhesive field 14, being transparent, enables viewing from either the finished or unfinished surface.

Example 13

The construction shown in FIG. 1 was roll laminated to Panaflex 945 substrate (3M Company) using a lamination temperature of 110 °C., a line speed of 1.6 m/min., and a lamination nip pressure of 0.180 kg/ lineal cm. Such lamination provided decoration of large areas of the substrate materials and can be repeated with any color in which film 12 can be produced.

Example 14

Film 10 was applied to a rigid 9.5 millimeter acrylic substrate (Plexiglas® from Rohm and Haas) using the method described in example 11. A thermoforming operation was then performed using a Formech 450 vacuum forming system (Formech Inc., London, England). Following heating of the construction to 165° C., and removal of the forming system's heating unit, a wooden mold on the forming system's vacuum bed was impressed into the softened, decorated substrate and a vacuum of 0.5 atmospheres was drawn, forming the substrate to the mold. Following 3 minutes cooling, the vacuum was turned off and the mold removed from the formed acrylic.

Example 15

The construction shown in FIG. 1, prepared according to Example 6 was imaged by cutting through both film 10 and liner 28. The graphics thus produced were applied to flexible and rigid substrates as described in Example 11.

The invention is not limited by the embodiments disclosed. For example, one skilled in the art can appreciate the use of the present invention in a continuous laminator, the use of layers of the present invention on rigid substrates, and the use of vacuum forming beyond that described in Example 14.

The claims of the invention follow.

What is claimed is:

1. A translucent, heat activated marking film comprising a translucent, plastic film having two major surfaces, a heat activated, translucent adhesive on one major surface of the plastic film, and a polymeric liner on the second major surface, wherein the adhesive, upon heat activation is adapted to transfer the plastic film to a flexible substrate, wherein the liner is removable from the plastic film after transfer of the adhesive and the plastic film to the flexible substrate, and wherein the adhesive is nonreactive with both the plastic film and the flexible substrate.

2. The marking film of claim 1, further comprising a presize coating between the liner and the plastic film and further comprising a protective clear layer between the plastic film and the presize coating.

3. The marking film of claim 1, further comprising a presize coating between the liner and the plastic film and further comprising a presize coating on a major surface of the liner not contacting the plastic film.

4. The marking film of claim 3, further comprising an antistatic coating between the major surface of the liner not contacting the plastic film and the presize coating.

5. The marking film of claim 1, wherein plastic film comprises a composition selected from group consisting of polyvinyl fluoride, polyvinylidene fluoride, acrylic-urethane films, vinyl-containing plastic films, and combinations thereof; and pigments to provide a color to the plastic film.

6. The marking film of claim 1, wherein the plastic film comprises a translucent vinyl film having a formulation of from about 42 to about 56 weight percent polyvinyl chloride, from about 0 to about 25 weight percent acrylic resin; from about 15 to about 25 weight percent plasticizers; from about 0 to 33 weight percent pigment; from about 0.5 to about 8 weight percent stabilizers; and from about 0.1 to about 6 weight percent ultra-violet protectors.

7. The marking film of claim 1, wherein the adhesive is not tacky at room temperatures but become activated through the application of heat ranging from about 65 to about 110° C.

8. The film of claim 7, wherein the adhesive is selected from the group consisting of (meth)acrylic (co)polymers having a glass transition temperature ranging from about 15° to about 63° C., vinyl chloride—vinyl acetate copolymers, and blends thereof.

\* \* \* \* \*